United States Patent
Ma et al.

(10) Patent No.: US 11,258,060 B2
(45) Date of Patent: Feb. 22, 2022

(54) NEGATIVE ELECTRODE PLATE, SECONDARY BATTERY, BATTERY MODULE, BATTERY PACK, AND APPARATUS

(71) Applicant: CONTEMPORARY AMPEREX TECHNOLOGY CO., LIMITED, Ningde (CN)

(72) Inventors: Jianjun Ma, Ningde (CN); Libing He, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/130,787

(22) Filed: Dec. 22, 2020

(65) Prior Publication Data
US 2021/0111399 A1 Apr. 15, 2021

Related U.S. Application Data

(63) Continuation of application No. PCT/CN2019/111050, filed on Oct. 14, 2019.

(30) Foreign Application Priority Data

Oct. 31, 2018 (CN) .......................... 201811284002.2

(51) Int. Cl.
*H01M 4/133* (2010.01)
*H01M 4/36* (2006.01)
(Continued)

(52) U.S. Cl.
CPC .......... *H01M 4/366* (2013.01); *H01M 4/133* (2013.01); *H01M 4/587* (2013.01);
(Continued)

(58) Field of Classification Search
CPC ...... H01M 4/366; H01M 4/133; H01M 4/587; H01M 10/0525; H01M 2004/021;
(Continued)

(56) References Cited

U.S. PATENT DOCUMENTS

| | | | |
|---|---|---|---|
| 2011/0123866 A1* | 5/2011 | Pan ....................... | H01M 4/505 429/221 |
| 2014/0091760 A1* | 4/2014 | Miyazaki ............ | H01M 50/409 320/109 |

(Continued)

FOREIGN PATENT DOCUMENTS

| CN | 104321912 A | 1/2015 |
|---|---|---|
| CN | 105960726 A | 9/2016 |

(Continued)

OTHER PUBLICATIONS

Contemporary Amperex Technology Co., Limited, International Search Report and Written Opinion, PCT/CN2019/111050, dated Jan. 16, 2020, 14 pgs.

*Primary Examiner* — Cynthia K Walls
(74) *Attorney, Agent, or Firm* — Morgan, Lewis & Bockius LLP (57) ABSTRACT

This application provides a negative electrode plate, a secondary battery, a battery module, a battery pack, and an apparatus. The negative electrode plate includes a negative current collector and a plurality of active substance layers formed on the negative current collector, where the plurality of active substance layers include at least a first active substance layer and a second active substance layer; the first active substance layer includes a first negative active substance, and the second active substance layer includes a second negative active substance; a ratio of thickness of the negative active substance of the first active substance layer to average particle size of the first negative active substance is 2.0 to 4.0; and a ratio of thickness of the second active substance layer to average particle size of the second negative active substance is 2.2 to 5.0.

19 Claims, 3 Drawing Sheets

(51) Int. Cl.
*H01M 4/587* (2010.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/027* (2013.01)

(58) Field of Classification Search
CPC .. H01M 2004/027; H01M 4/36; H01M 4/505; H01M 4/525; H01M 4/485; H01M 4/66; H01M 4/13; H01M 4/667; Y02E 60/10
See application file for complete search history.

(56) References Cited

U.S. PATENT DOCUMENTS

2014/0363736 A1* 12/2014 Kim ...................... H01M 4/505
429/220
2016/0211554 A1* 7/2016 Umeyama ........... H01M 4/0471

FOREIGN PATENT DOCUMENTS

| CN | 106328885 A | 1/2017 |
|---|---|---|
| CN | 108666525 A | 10/2018 |
| JP | 2002151055 A | 5/2002 |
| JP | 2006210003 A | 8/2006 |

\* cited by examiner

NEGATIVE ELECTRODE PLATE, SECONDARY BATTERY, BATTERY MODULE, BATTERY PACK, AND APPARATUS

CROSS-REFERENCE TO RELATED APPLICATIONS

This application is a continuation application of PCT Patent Application No. PCT/CN2019/111050, entitled "NEGATIVE POLE PII CE, SECONDARY BATTERY BATTERY MODULE, BATTERY PACK, AND DEVICE" filed on Oct. 14, 2019, which claims priority to Chinese Patent Application No. 201811284002.2, filed with the State Intellectual Property Office of the People's Republic of China on Oct. 31, 2018, and entitled "NEGATIVE ELECTRODE PLATE AND SECONDARY BATTERY", all of which are incorporated herein by reference in their entirety.

TECHNICAL FIELD

This application relates to the technical field of secondary batteries, and in particular, to a negative electrode plate, a secondary battery using the negative electrode plate, a battery module, a battery pack, and an apparatus.

BACKGROUND

Rechargeable batteries have been widely used in recent years due to their advantages of high energy density, high operating voltage, long service life, and low self-discharge. However, with the increasing popularity of electric vehicles, higher requirements are imposed on the energy density and fast charging performance of the rechargeable batteries.

How to make the batteries achieve a balance between high energy density and fast charging capability is still one of the important issues in the industry. Therefore, constant efforts are needed to address this issue.

SUMMARY

In view of the issue in the Background, this application provides a negative electrode plate, a secondary battery, a battery module, a battery pack, and an apparatus. The secondary battery has high energy density, long cycle life, and fast charging performance.

To achieve the objectives of this application, a first aspect of this application provides a negative electrode plate. The negative electrode plate includes a negative current collector, a first active substance layer disposed on at least one surface of the negative current collector, and a second active substance layer disposed on the first active substance layer;

where the first active substance layer includes a first negative active substance, and the second active substance layer includes a second negative active substance; and in the negative electrode plate, the following relationships are satisfied: $2.0 \leq B/A \leq 4.0$, and $2.2 \leq D/C \leq 5.0$, where A is an average particle size of the first negative active substance;

B is a thickness of the first active substance layer;

C is an average particle size of the second negative active substance; and

D is a thickness of the second active substance layer.

A second aspect of this application provides a secondary battery, including the negative electrode plate in the first aspect of this application.

A third aspect of this application provides a battery module, including the secondary battery in the second aspect of this application.

A fourth aspect of this application provides a battery pack, including the battery module in the third aspect of this application.

A fifth aspect of this application provides an apparatus, including the secondary battery in the second aspect of this application, where the secondary battery is used as a power source of the apparatus.

In some embodiments, the apparatus includes a mobile device, an electric vehicle, an electric train, a satellite, a ship, and an energy storage system.

Compared with the prior art, this application includes at least the following beneficial effects:

The negative electrode plate of this application includes a structure of two active substance layers, and thickness of each active substance layer and particle size of an active substance in each active substance layer are adjusted during design, thereby obtaining a secondary battery that achieves a balance between high energy density, long cycle life, and fast charging performance.

The battery module, the battery pack, and the apparatus in this application include the secondary battery, and therefore have at least the same advantages as the secondary battery.

Reference signs are described as follows:

1. battery pack;
2. upper box body;
3. lower box body;
4. battery module; and
5. secondary battery.

DESCRIPTION OF EMBODIMENTS

The following describes in detail a negative electrode plate, a secondary battery, a battery module, a battery pack, and an apparatus in this application.

First, a negative electrode plate provided in a first aspect of this application is described. The negative electrode plate includes a negative current collector, a first active substance layer disposed on at least one surface of the negative current collector, and a second active substance layer disposed on the first active substance layer;

where the first active substance layer includes a first negative active substance, and the second active substance layer includes a second negative active substance; and in the negative electrode plate, the following relationships are satisfied: $2.0 \leq B/A \leq 4.0$, and $2.2 \leq D/C \leq 5.0$, where A is average particle size of the first negative active substance;

B is thickness of the first active substance layer;

C is average particle size of the second negative active substance; and

D is thickness of the second active substance layer.

In some embodiments, in the negative electrode plate of this application, 2.5≤B/A≤3.5.

In some embodiments, in the negative electrode plate of this application, 2.8≤D/C≤4.5.

The inventors of this application have found that, under same raw materials and a same processing technique, a negative active substance with larger particle size indicates a higher gram capacity, fewer negative active substances needed for a battery having an expected capacity, and a higher energy density of a battery. However, larger particle size of the negative active substance indicates a longer solid-phase diffusion path of active ions, and greater resistance, thereby affecting fast charging performance of the battery. On the contrary, smaller particle size indicates a shorter solid-phase diffusion path of the active ions, and smaller resistance, thereby helping improve the fast charging performance of the battery. However, excessively small particle size indicates a relatively small gram capacity, thereby affecting energy density of battery cells to some extent. In addition, a negative electrode slurry is difficult to disperse and stir, and adhesion between active substance particles of a made negative electrode plate and a current collector and adhesion between the active substance particles of a negative electrode are relatively small, affecting the energy density and the cycle life of the battery.

The inventors of this application have also found that smaller thickness of an active substance layer of a negative electrode allows better infiltration of a negative electrolyte and faster liquid conduction of active ions in an electrode plate. During long-term cycling of a battery, polarization of the battery is not significantly increased, and few side reactions are produced, thereby reducing safety issues caused by formation of lithium dendrites on a surface of the negative electrode. However, excessively small thickness of a membrane greatly affects energy density of the battery. On the contrary, larger thickness of a negative active substance layer using an identical negative active substance indicates a higher energy density of the battery. However, during cycling of the battery, excessively large thickness of the membrane makes infiltration of an electrolyte of an electrode plate difficult, resulting in an increase in a transmission resistance of active ions and an increase in polarization of the battery. This leads to uneven local current distribution of the battery and causes lithium plating, fastening degradation of the capacity of the battery and affecting the cycle life of the battery.

If an optimization is independently made from the perspective of either particle size of the negative active substance or thickness of an active substance layer of the electrode plate, implementation of a secondary battery that achieves a balance between high energy density, long cycle life, and fast charging performance is greatly limited.

Through extensive research, the inventors of this application have found that by designing a negative electrode plate with a two-layer structure, and adjusting a ratio of thickness of an active substance layer to a gram capacity of a negative active substance so that the negative electrode plate satisfies both the following relationships: 2.0≤B/A≤4.0, and 2.2≤D/C≤5.0, and the battery can have the advantages of a long cycle life, a high energy density, and fast charging at the same time.

In the negative electrode plate designed in this application, the first negative active substance in the first active substance layer has relatively large particle size. On the one hand, under the same thickness, a higher capacity can be provided, so that a capacity per unit area is increased. On the other hand, under the same thickness, larger particle size of the negative active substance indicates a smaller quantity of accumulation layers of the active substance in the active substance layer, fewer side reactions caused when charges are exchanged on a surface of the active substance, and a more stable and denser SEI layer formed on the surface, thereby helping improve the cycle performance of a battery. If B/A is less than 2.0, it indicates that the average particle size of the first active substance is excessively large, the thickness of the active substance layer is excessively small, that is, the quantity of the accumulation layers of the active substance is excessively small, the solid-phase diffusion path of the active ions in the negative active substance is relatively long, and internal resistance is increased, affecting the fast charging capability of the battery. In addition, excessively small thickness of the active substance layer indicates that an electrode plate easily exhibits "particle scratches", resulting in poor appearance. If B/A is greater than 4.0, it indicates that the average particle size of the first active substance is excessively small, the thickness of the active substance layer is excessively large, that is, the quantity of accumulation layers of the active substance is excessively large, and a liquid-phase transfer path of the active ions is excessively long, affecting the fast charging capability of the battery.

In the negative electrode plate designed in this application, the second negative active substance in the second active substance layer has small particle size. Under the same thickness, there are more small-grained active substances. On the one hand, fast bounce can follow cold pressing, so that porosity of a surface electrode plate is increased, facilitating infiltration of an electrolyte and liquid-phase transfer of the active ions. On the other hand, a diffusion path of the active ions in the small-grained active substance is shortened, so that a solid-phase diffusion resistance of the active ions is decreased, and the active ions can be intercalated and released quickly, improving fast charging performance of the battery. If D/C is less than 2.2, it indicates that the average particle size of the second active substance is excessively large, the thickness of the active substance layer is excessively small, material particles may be larger than the thickness of the active substance layer, and problems in the electrode plate processing, such as large particles and lines, are easily caused. If D/C is greater than 5.0, it indicates that the thickness of the second active substance layer is large, and the particle size of the second active substance is excessively small. Excessively small particle size imposes specific difficulties for slurry stirring, appearance and adhesion of an electrode plate are affected, and therefore cycle performance of battery cells is affected. In addition, the thickness of the second active substance layer is relatively large, so that a transfer path of the active ions is relatively long, affecting the fast charging capability of the battery.

In some embodiments of this application, a lower limit of B/A may be 2.0, 2.1, 2.2, 2.3, 2.4, 2.5, 2.6, or 2.7; and an upper limit of B/A may be 2.8, 2.9, 3.0, 3.1, 3.2, 3.3, 3.4, 3.5, 3.6, 3.7, 3.8, 3.9, or 4.0.

In some embodiments of this application, a lower limit of D/C may be 2.2, 2.3, 2.4, 2.5, 2.6, 2.7, 2.8, 2.9, or 3.0; and an upper limit of D/C may be 3.2, 3.4, 3.6, 3.8, 4.0, 4.2, 4.4, 4.6, 4.8, or 5.0.

In some embodiments, in the negative electrode plate in this application, average particle size A of the first negative active substance is greater than or equal to average particle size C of the second negative active substance. More specifically, in the negative electrode plate, 0.4≤C/A≤1.0. When the second negative active substance has smaller particle size than the first negative active substance, the active ions can be easily intercalated or released, improving the fast charging performance of the battery. In addition, the particle size of the first active substance is relatively large, so that the battery can have smaller thickness of the active substance layer while achieving a same energy density. This is more conducive to diffusion of active ions, thereby avoiding polarization and lithium plating, decreasing side reactions, and further improving the cycle life of the battery.

In some embodiments, in the negative electrode plate in this application, thickness B of the first active substance layer is greater than or equal to thickness D of the second active substance layer. More specifically, in the negative electrode plate, $0.2 \leq D/B \leq 1.0$. During cycling of the battery, if the thickness of the second active substance layer is smaller, the active ions can be intercalated into the first active substance layer through the second active substance layer in a short time, thereby avoiding lithium precipitation caused by accumulation of the active ions on a surface of the electrode plate, and further improving the fast charging performance of the battery.

In some embodiments, in the negative electrode plate in this application, $D/C \geq B/A$. The second active substance layer has a larger number of the accumulation layers of the active ions than the first active substance layer. When the quantity of the accumulation layers of the active ions is relatively large, electrochemical reactivity is enhanced, and liquid-phase and solid-phase impedances of the active ions are decreased, so that the active ions can quickly pass through the second active substance layer to reach the first active substance layer after coming off a positive electrode, thereby avoiding safety issues resulting from dendrites formed due to accumulation of the active ions on a surface of the electrode plate.

In some embodiments, in the negative electrode plate of this application, the average particle size A of the first negative active substance satisfies the following relationship: $12 \ \mu m \leq A \leq 25 \ \mu m$, more preferably, $15 \ \mu m \leq A \leq 19 \ \mu m$.

In some embodiments, in the negative electrode plate of this application, the thickness B of the first active substance layer satisfies the following relationship: $35 \ \mu m \leq B \leq 105 \ \mu m$, more preferably, $40 \ \mu m \leq B \leq 60 \ \mu m$.

In some embodiments, in the negative electrode plate in this application, the average particle size C of the second active substance layer satisfies the following relationship: $4 \ \mu m \leq C \leq 18 \ \mu m$, more preferably, $7 \ \mu m \leq C \leq 15 \ \mu m$.

In some embodiments, in the negative electrode plate of this application, the thickness D of the second active substance layer satisfies the following relationship: $10 \ \mu m \leq D \leq 45 \ \mu m$, more preferably, $20 \ \mu m \leq D \leq 40 \ \mu m$.

In some embodiments, in the negative electrode plate of this application, the first negative active substance and the second negative active substance are respectively selected from one or more of artificial graphite, natural graphite, mesocarbon microbeads, soft carbon, and hard carbon.

In some embodiments, in the negative electrode plate of this application, a degree of graphitization of the first negative active substance is greater than a degree of graphitization of the second negative active substance. A higher degree of graphitization of the first active substance indicates a higher degree of ordering of the active substance, fewer defects such as stacking faults and dislocations in crystals, and lower surface activity, so that a stable and dense SEI membrane is easily formed during cycling, helping improve cycle performance. A lower degree of graphitization of the second active substance indicates a larger spacing between crystal faces of the material, facilitating migration of the active ions into or out of the active substance, reducing the resistance, and preventing accumulation of the active ions on a surface of the electrode plate from affecting the fast charging capability of the battery. Therefore, ensuring that the degree of graphitization of the first negative active substance is greater than that of the second negative active substance can ensure not only a required energy density of battery cells, but also fast charging capability of the battery cells.

A second aspect of this application provides a secondary battery, including a positive electrode plate, a negative electrode plate, a separator, and an electrolyte, where the negative electrode plate is the negative electrode plate provided in the first aspect of this application.

In the secondary battery of the second aspect of this application, the positive electrode plate includes a positive current collector, and a positive electrode membrane that is provided on at least one surface of the positive current collector and that includes a positive active substance.

In the secondary battery of the second aspect of this application, a type of the positive active substance is not specifically limited, and the positive active substance may be a well-known conventional material that can be used as a positive active substance for the secondary battery in existing batteries. For example, the positive active substance may be selected from a lithium cobalt oxide, a lithium nickel oxide, a lithium manganese oxide, a lithium nickel manganese oxide, a lithium nickel cobalt manganese oxide, a lithium nickel cobalt aluminum oxide, a lithium-containing phosphate of an olivine structure, and the like. One type of these positive active substances may be used alone, or two or more types may be used in combination. In some embodiments, the positive active substance is selected from one or more of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{1.5}Al_{0.05}O_2$, $LiFePO_4$ (LFP), and $LiMnPO_4$.

In the secondary battery of the second aspect of this application, a type of the separator is not specifically limited, and the separator may be, but is not limited to, any separator material used in existing batteries, for example, polyethylene, polypropylene, polyvinylidene fluoride, and a multi-layer composite film thereof.

In the secondary battery in the second aspect of this application, the electrolyte includes an electrolyte salt and an organic solvent, where specific types and compositions of the electrolyte salt and the organic solvent are not specifically limited, and may be selected depending on actual needs. The electrolyte may further include an additive. A type of the additive is not particularly limited, and the additive may be a negative film-forming additive, a positive film-forming additive, or an additive that can improve specific performance of the battery, for example, an additive for improving overcharge performance of the battery, an additive for improving high-temperature performance of the battery, or an additive for improving low-temperature performance of the battery.

A third aspect of this application provides a battery module, including any one or more types of the secondary batteries in the second aspect of this application.

Further, a quantity of secondary batteries included in the battery module may be adjusted based on application and a capacity of the battery module.

Figure 1:
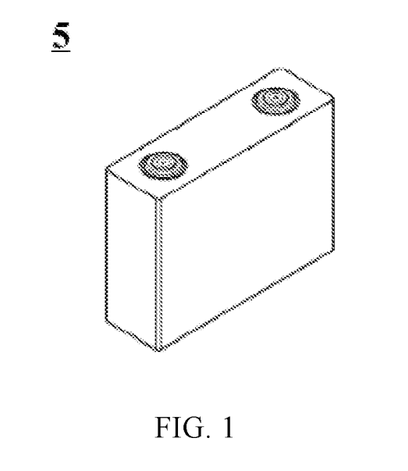
FIG. 1 is a schematic diagram of an embodiment of a secondary battery.
Figure 2:
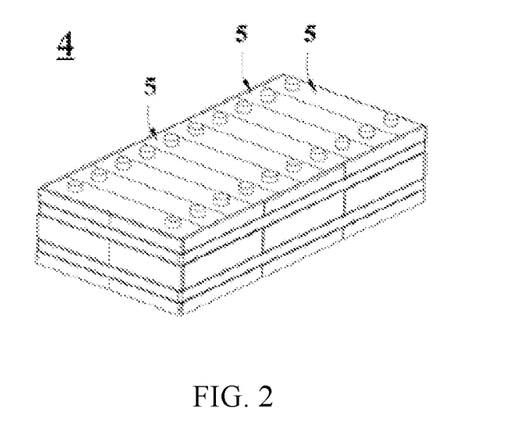
FIG. 2 is a schematic diagram of an embodiment of a battery module.

In some embodiments, referring to FIG. 1 and FIG. 2, in the battery module 4, a plurality of secondary batteries 5 may be sequentially arranged along a length direction of the battery module 4. Certainly, an arrangement may be made in any other manner. Further, the plurality of secondary batteries 5 may be fastened through fasteners.

In some embodiments, the battery module 4 may further include a housing with an accommodating space, and the plurality of secondary batteries 5 are accommodated in the accommodating space.

A fourth aspect of this application provides a battery pack, including any one or more of the battery modules in the third aspect of this application. In other words, the battery pack includes any one or more of the secondary batteries in the second aspect of this application.

A quantity of battery modules in the battery pack may be adjusted based on application and a capacity of the battery pack.

Figure 3:
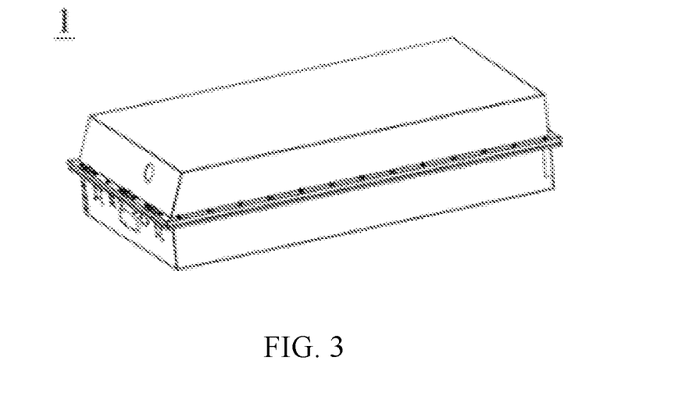
FIG. 3 is a schematic diagram of an embodiment of a battery pack.
Figure 4:
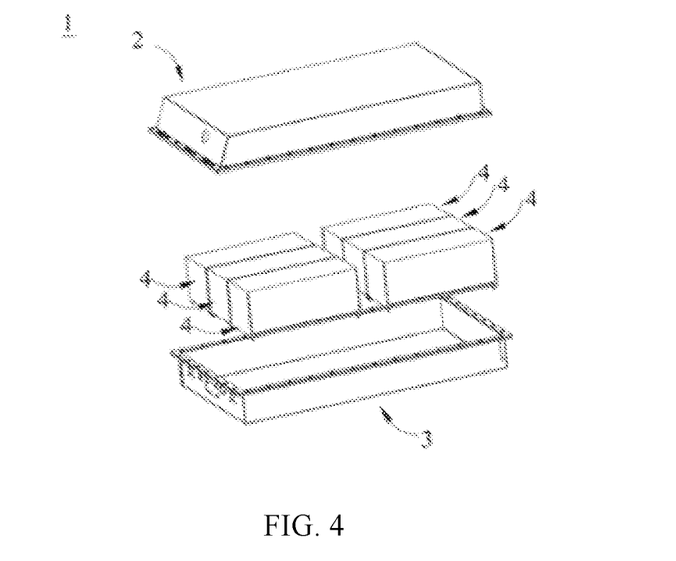
FIG. 4 is an exploded view of FIG. 3.

In some embodiments, referring to FIG. 3 and FIG. 4, the battery pack 1 may include a battery box and a plurality of battery modules 4 disposed in the battery box. The battery box includes an upper case 2 and a lower case 3. The upper case 2 can cover the lower case 3 to form an enclosed space for accommodating the battery modules 4. The plurality of battery modules 4 may be arranged in the battery box in any manner.

A fifth aspect of this application provides an apparatus, including any one or more of the secondary batteries in the second aspect of this application. The secondary battery may be used as a power source of the apparatus.

In some embodiments, the apparatus may be, but is not limited to, a mobile device (for example, a mobile phone or a notebook computer), an electric vehicle (for example, a full electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

Figure 5:
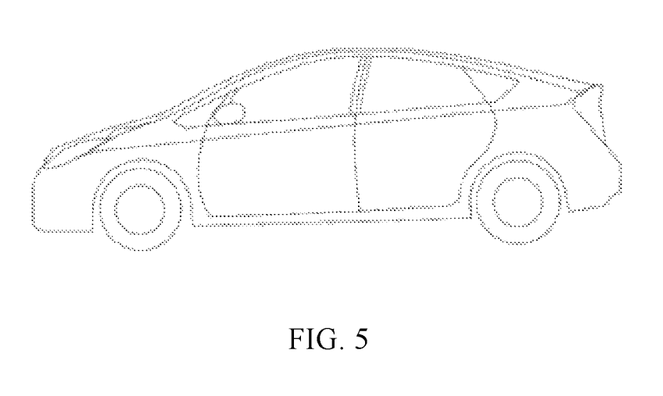
FIG. 5 is a schematic diagram of an embodiment of an apparatus using a secondary battery as a power source.

For example, FIG. 5 shows the apparatus including the secondary battery in this application. The apparatus is a full electric vehicle, a hybrid electric vehicle, a plug-in hybrid electric vehicle, or the like. The secondary battery in this application supplies power to the apparatus.

The battery module, the battery pack, and the apparatus include the secondary battery provided in this application, and therefore have at least the same advantages as the secondary battery. Details are not described herein again.

The following uses a lithium-ion battery as an example to further describe this application with specific embodiment examples and comparative examples. These embodiment examples are merely intended to describe this application, and this application is not limited to the following embodiment examples. Any modification or equivalent replacement of the technical solutions of this application without departing from the scope of the technical solutions of this application shall fall within the protection scope of this application.

EXAMPLE 1

Positive electrode plate: An active substance $LiNi_{0.8}Co_{0.1}Mn_{0.1}O_2$ (NCM811), a conductive agent acetylene black, and a bonding agent polyvinylidene fluoride (PVDF) were fully stirred and evenly mixed in an N-methylpyrrolidone solvent system at a weight ratio of 96.8:2.2:1, and the resulting mixture was applied on an aluminum foil, followed by drying and cold pressing, to obtain a positive electrode plate.

Negative electrode plate: A first negative active substance (see Table 1 for details), Super P, sodium carboxymethyl cellulose, and a styrene-butadiene rubber (SBR) latex were mixed at a weight ratio of 96.2:0.8:1.2:1.8 to obtain a first negative active substance slurry, and the slurry was applied on both surfaces of a current collector (copper foil) to obtain first active substance layers; a second negative active substance (see Table 1 for details), Super P, sodium carboxymethyl cellulose, and a styrene-butadiene rubber (SBR) latex were mixed at a weight ratio of 96.2:0.8:1.2:1.8 to obtain a second negative active substance slurry, and the slurry was applied on the first active substance layers to obtain second active substance layers. After cold pressing and cutting, a negative electrode plate was obtained.

Separator: APE porous polymer film was used as a separator.

Electrolyte: Ethylene carbonate (EC), ethyl methyl carbonate (EMC), and diethyl carbonate (DEC) were mixed at a volume ratio of 3:6:1, and a fully dried lithium salt $LiPF_6$ was dissolved in a mixed organic solvent at a proportion of 1 mol/L, to obtain an electrolyte.

Full battery preparation: The positive electrode plate, the separator, and the negative electrode plate were stacked in order, so that the separator was placed between positive and negative electrodes to play a role of isolation, and winding was performed to obtain a bare cell. The bare cell was placed in an outer packaging case, the prepared electrolyte was injected into the dried bare cell, and after steps such as vacuum packaging, standing, chemical conversion, and shaping, a lithium-ion secondary battery was obtained.

The batteries in Examples 2 to 13 and Comparative Examples 1 to 6 were all prepared according to a method similar to that in Example 1, and specific differences are shown in Table 1. Table 1 shows parameters of Examples 1 to 13 and Comparative Examples 1 to 6.

TABLE 1

| No. | Type of first active substance | Degree of graphitization of first active substance, % | A | B | Type of second active substance | Degree of graphitization of second active substance, % | C | D |
| --- | --- | --- | --- | --- | --- | --- | --- | --- |
| Example 1 | Artificial | 96 | 17 | 40 | Artificial | 94 | 8 | 40 |
| Example 2 | Artificial | 96 | 17 | 45 | Artificial | 94 | 8 | 35 |
| Example 3 | Artificial | 96 | 17 | 50 | Artificial | 94 | 8 | 30 |
| Example 4 | Artificial | 96 | 17 | 55 | Artificial | 94 | 8 | 25 |
| Example 5 | Artificial | 96 | 17 | 60 | Artificial | 94 | 8 | 20 |
| Example 6 | Artificial | 96 | 15 | 50 | Artificial | 94 | 8 | 35 |
| Example 7 | Artificial | 96 | 17 | 50 | Artificial | 94 | 10 | 35 |
| Example 8 | Artificial | 96 | 18 | 50 | Artificial | 94 | 12 | 35 |
| Example 9 | Artificial | 96 | 19 | 50 | Artificial | 94 | 14 | 35 |
| Example 10 | Artificial | 96 | 12 | 35 | Artificial | 94 | 4 | 10 |
| Example 11 | Artificial | 96 | 25 | 105 | Artificial | 94 | 18 | 45 |

TABLE 1-continued

| No. | Type of first active substance | Degree of graphitization of first active substance, % | A | B | Type of second active substance | Degree of graphitization of second active substance, % | C | D |
|---|---|---|---|---|---|---|---|---|
| Example 12 | Natural | 98 | 18 | 50 | Artificial | 94 | 8 | 35 |
| Example 13 | Natural | 98 | 15 | 50 | Artificial | 94 | 8 | 35 |
| Comparative Example 1 | Artificial | 96 | 17 | 45 | Artificial | 94 | 3 | 35 |
| Comparative Example 2 | Artificial | 96 | 17 | 45 | Artificial | 94 | 20 | 35 |
| Comparative Example 3 | Artificial | 96 | 17 | 30 | Artificial | 94 | 8 | 35 |
| Comparative Example 4 | Artificial | 96 | 17 | 110 | Artificial | 94 | 8 | 35 |
| Comparative Example 5 | Artificial | 96 | 12 | 60 | Artificial | 94 | 15 | 20 |
| Comparative Example 6 | Artificial | 96 | 25 | 40 | Artificial | 94 | 7 | 40 |

In the table, A represents particle size (μm) of the first negative active substance, B represents thickness (μm) of the first active substance layer, C represents particle size (μm) of the second negative active substance, and D represents thickness (μm) of the second active substance layer.

Battery Performance Tests (1) Cycle Performance Test

Full battery cycle performance tests were all tested in Examples and Comparative Examples according to the following method including the steps of:

performing first charging and discharging in a 25° C. environment, and performing constant-current and constant-voltage charging at a charge current of 1.0 C (that is, a current that discharges a theoretical capacity completely within 1 hour) until an upper-limit voltage was 4.2 V; then performing constant-current discharging at a discharge current of 1.0 C until a final voltage was 2.8 V, and recording a discharge capacity at the first cycle; then performing continuous charge and discharge cycling.

Capacity retention rate after cycling=(Discharge capacity at the $n$-th cycle/Discharge capacity at the first cycle)×100

(2) Rate Performance Test

Rate performance was tested by the following steps of: performing a charge and discharge test in a 25° C. environment, and performing constant-current discharging at a discharge current of 1.0 C (that is, a current that discharges a theoretical capacity completely within 1 hour) until a voltage was 2.8 V; then performing constant-current charging at a charge current of 1.0 C until a voltage was 4.2 V, and continuing to perform constant-voltage charging until a current was 0.05 C, where in this case, the battery was in a fully charged state; placing the fully charged battery still for 5 min, and performing constant-current discharging to 2.8 V at a discharge current of 1.0 C, where in this case, a discharge capacity was an actual capacity of the battery at 1.0 C, and was denoted as C0; performing constant-current charging on the battery at 1 C to 4.2 V, and then performing constant-voltage charging until a current was 0.05 C; placing the battery still for 5 min, performing constant-current discharging at 2 C to 2.8 V, and recording a discharge capacity C1 which was a discharge capacity at 2 C.

Rate capacity retention rate at 2C=(Discharge capacity at 2C/Discharge capacity at 1C)×100%.

(3) Lithium Precipitation Rate Test

Lithium Precipitation rate was tested by the following steps of: performing a charge and discharge test in a 25° C. environment, and performing constant-current discharging at a discharge current of 1.0 C (that is, a current that discharges a theoretical capacity completely within 1 hour) until a voltage was 2.8 V; then performing constant-current charging at a charge current of 1.0 C until a voltage was 4.2 V, and continuing to perform constant-voltage charging until a current was 0.05 C, where in this case, the battery was in a fully charged state; placing the fully charged battery still for 5 min, and performing constant-current discharging to 2.8 V at a discharge current of 1.0 C, where in this case, a discharge capacity was an actual capacity of the battery at 1.0 C, and was denoted as C0; then charging the battery to 4.2 V at a constant current of xC0, performing constant-voltage charging until a current was 0.05 C0, placing the battery still for 5 min, disassembling the battery, observing a lithium precipitation status on an interface, adjust a charging rate until lithium plating occurred, and determining a lithium plating rate.

According to the foregoing method, the cycle, rate, and lithium precipitation performances of the batteries in the Examples and Comparative Examples were measured. For details about test results of Examples and Comparative Examples, see Table 2. Table 2 showed performance test results of Examples 1 to 13 and Comparative Examples 1 to 6.

TABLE 2

| No. | B/A | D/C | Capacity retention rate after 1000 cycles, % | Capacity retention rate at 2 C, % | Lithium precipitation rate |
|---|---|---|---|---|---|
| Example 1 | 2.4 | 5.0 | 90 | 85 | 1.4 C |
| Example 2 | 2.6 | 4.4 | 92 | 88 | 1.6 C |
| Example 3 | 2.9 | 3.8 | 91 | 86 | 1.5 C |
| Example 4 | 3.2 | 3.1 | 90 | 86 | 1.4 C |
| Example 5 | 3.5 | 2.5 | 89 | 84 | 1.3 C |
| Example 6 | 3.3 | 4.4 | 92 | 88 | 1.7 C |
| Example 7 | 2.9 | 3.5 | 95 | 92 | 2.1 C |
| Example 8 | 2.8 | 2.9 | 93 | 90 | 1.8 C |
| Example 9 | 2.6 | 2.5 | 89 | 87 | 1.5 C |
| Example 10 | 2.9 | 2.5 | 85 | 84 | 1.4 C |
| Example 11 | 4.2 | 2.5 | 88 | 85 | 1.5 C |
| Example 12 | 2.8 | 4.4 | 88 | 86 | 1.4 C |
| Example 13 | 3.3 | 4.4 | 89 | 87 | 1.5 C |
| Comparative Example 1 | 2.6 | 11.7 | 80 | 82 | 1.2 C |
| Comparative Example 2 | 2.6 | 1.8 | 85 | 70 | 0.5 C |

TABLE 2-continued

| No. | B/A | D/C | Capacity retention rate after 1000 cycles, % | Capacity retention rate at 2 C, % | Lithium precipitation rate |
|---|---|---|---|---|---|
| Comparative Example 3 | 1.8 | 4.4 | 76 | 72 | 0.5 C |
| Comparative Example 4 | 6.5 | 4.4 | 80 | 60 | 0.3 C |
| Comparative Example 5 | 5.0 | 1.3 | 80 | 55 | 0.2 C |
| Comparative Example 6 | 1.6 | 5.7 | 60 | 65 | 0.7 C |

In the table, A represents particle size (μm) of the first negative active substance, B represents thickness (μm) of the first active substance layer, C represents particle size (μm) of the second negative active substance, and D represents thickness (μm) of the second active substance layer.

In Examples 1 to 13, a ratio of thickness of each active substance layer to particle size of the active substances in each layer was properly adjusted, so that the negative electrode plate satisfied both the following relationships: 2.0≤B/A≤4.0 and 2.2≤D/C≤5.0. Therefore, the batteries can achieve a balance between long cycle life, high energy density, and high-rate charging.

Compared with Examples 1 to 13, in Comparative Examples 1 to 6, none of the batteries were in the given ranges of B/A and D/C at the same time, and therefore the batteries cannot achieve a balance between long cycle life, high energy density, and high-rate charging.

In Comparative Examples 1 and 2, B/A was within the given range, D/C was not within the given range, and cycle, rate and lithium precipitation performances of the batteries deteriorated obviously. In Comparative Example 1, the particle size of the second negative active substance was not within the range of 4 μm to 18 μm. Excessively small particle size caused slurry dispersion difficulty, and a high surface activity caused side reactions, thereby deteriorating the cycle performance of the battery. In Comparative Example 2, the particle size of the second negative active substance was not within the range of 4 μm to 18 μm. An excessively large particle size caused an increase in the solid-phase diffusion resistance of the active ions. This leaded to an increase in polarization, affecting rate and lithium plating performances of the battery.

In Comparative Examples 3 and 4, B/A was not within the given range, D/C was within the given range, and cycle, rate, and lithium precipitation performances of the batteries were significantly decreased. In Comparative Example 3, the thickness of the first negative active substance layer was not within the range of 35 μm to 105 μm. Excessively small thickness of the first active substance layer easily caused anomalies in processing, affecting the battery performance. In addition, a quantity of accumulation layers of the active substance was excessively small, so that the active substance and the electrolyte had an insufficient contact area, which was disadvantageous for liquid phase transfer of the active substance, deteriorating the cycle and lithium plating performances of the battery.

In Comparative Examples 5 and 6, although the particle size of the active substance and the thickness of the active substance layer were within the given ranges, neither B/A nor D/C was within their given ranges, so that cycle, rate and lithium precipitation performances of the batteries were degraded obviously.

Although this application is disclosed above with preferred embodiments, they are not intended to limit the claims. Any person skilled in the art can make several possible changes and modifications without departing from the concept of this application. Therefore, the protection scope of this application shall be subject to the scope demarcated by the claims of this application.

What is claimed is:

1. A secondary battery, comprising a negative electrode plate, wherein the negative electrode plate comprises:
   a negative current collector, a first active substance layer disposed on at least one surface of the negative current collector, and a second active substance layer disposed on the first active substance layer;
   wherein the first active substance layer comprises a first negative active substance, and the second active substance layer comprises a second negative active substance; and
   the following relationships are satisfied: 2.0≤B/A≤4.0, 2.2≤D/C≤5.0 and D/C ≥B/A, wherein
   A is an average particle size of the first negative active substance;
   B is a thickness of the first active substance layer;
   C is an average particle size of the second negative active substance; and
   D is a thickness of the second active substance layer.

2. The secondary battery according to claim 1, wherein 2.5≤B/A≤3.5.

3. The secondary battery according to claim 1, wherein 2.8≤D/C≤4.5.

4. The secondary battery according to claim 1, wherein A ≥C.

5. The secondary battery according to claim 4, wherein 0.4≤C/A≤1.0.

6. The secondary battery according to claim 1, wherein B ≥D.

7. The secondary battery according to claim 6, wherein 0.2≤D/B≤1.0.

8. The secondary battery according to claim 1, wherein 12 μm≤A≤25 μm; or 35 μm≤B≤105 μm; or 4 μm≤C≤18 μm; or 10 μm≤D≤45 μm.

9. The secondary battery according to claim 8, wherein 15 μm≤A≤19 μm.

10. The secondary battery according to claim 8, wherein 40 μm≤B≤60 μm.

11. The secondary battery according to claim 8, wherein 7 μm≤C≤15 μm.

12. The secondary battery according to claim 8, wherein 20 μm≤D≤40 μm.

13. The secondary battery according to claim 1, wherein the first negative active substance and the second negative active substance are respectively selected from one or more of artificial graphite, natural graphite, mesocarbon microbeads, soft carbon, and hard carbon.

14. The secondary battery according to claim 13, wherein a degree of graphitization of the first negative active substance is greater than a degree of graphitization of the second negative active substance.

15. A battery module, comprising a secondary battery, the secondary battery comprising a positive electrode plate, a negative electrode plate, a separator and electrolyte, wherein the negative electrode plate comprises:
   a negative current collector, a first active substance layer disposed on at least one surface of the negative current collector, and a second active substance layer disposed on the first active substance layer;

wherein the first active substance layer comprises a first negative active substance, and the second active substance layer comprises a second negative active substance; and the following relationships are satisfied: $2.0 \leq B/A \leq 4.0$, $2.2 \leq D/C \leq 5.0$, and $D/C \geq B/A$, wherein A is an average particle size of the first negative active substance;

B is a thickness of the first active substance layer;

C is an average particle size of the second negative active substance; and

D is a thickness of the second active substance layer.

16. The battery module according to claim 15, wherein the first negative active substance and the second negative active substance are respectively selected from one or more of artificial graphite, natural graphite, mesocarbon microbeads, soft carbon, and hard carbon.

17. An apparatus, comprising a secondary battery, the secondary battery comprising a positive electrode plate, a negative electrode plate, a separator and electrolyte, wherein the negative electrode plate comprises:

a negative current collector, a first active substance layer disposed on at least one surface of the negative current collector, and a second active substance layer disposed on the first active substance layer;

wherein the first active substance layer comprises a first negative active substance, and the second active substance layer comprises a second negative active substance; and the following relationships are satisfied: $2.0 \leq B/A \leq 4.0$, $2.2 \leq D/C \leq 5.0$, and $D/C \geq B/A$, wherein A is an average particle size of the first negative active substance;

B is a thickness of the first active substance layer;

C is an average particle size of the second negative active substance; and

D is a thickness of the second active substance layer.

18. The apparatus according to claim 17, wherein the first negative active substance and the second negative active substance are respectively selected from one or more of artificial graphite, natural graphite, mesocarbon microbeads, soft carbon, and hard carbon.

19. The apparatus according to claim 17, wherein the apparatus is one selected from the group consisting of a mobile device, an electric vehicle, an electric train, a satellite, a ship, and an energy storage system.

* * * * *